Dec. 4, 1962 D. C. ALLAIS ETAL 3,067,333

MOTION CONTROL APPARATUS FOR INFORMATION STORAGE DRAWERS

Filed Dec. 28, 1960 2 Sheets-Sheet 1

INVENTORS
David C. Allais
Frank A. Litz
Norman A. Vogel
BY

MOTION CONTROL APPARATUS FOR INFORMATION STORAGE DRAWERS

Filed Dec. 28, 1960 2 Sheets-Sheet 2

INVENTORS
David C. Allais
Frank A. Litz
Norman A. Vogel
BY 3,067,333

MOTION CONTROL APPARATUS FOR INFORMATION STORAGE DRAWERS

David C. Allais, Saratoga, Frank A. Litz, San Jose, and Norman A. Vogel, Saratoga, Calif., assignors to International Business Machines Corporation, New York, N.Y., a corporation of New York Filed Dec. 28, 1960, Ser. No. 79,056
3 Claims. (Cl. 250—237)

Figures 1, 2:
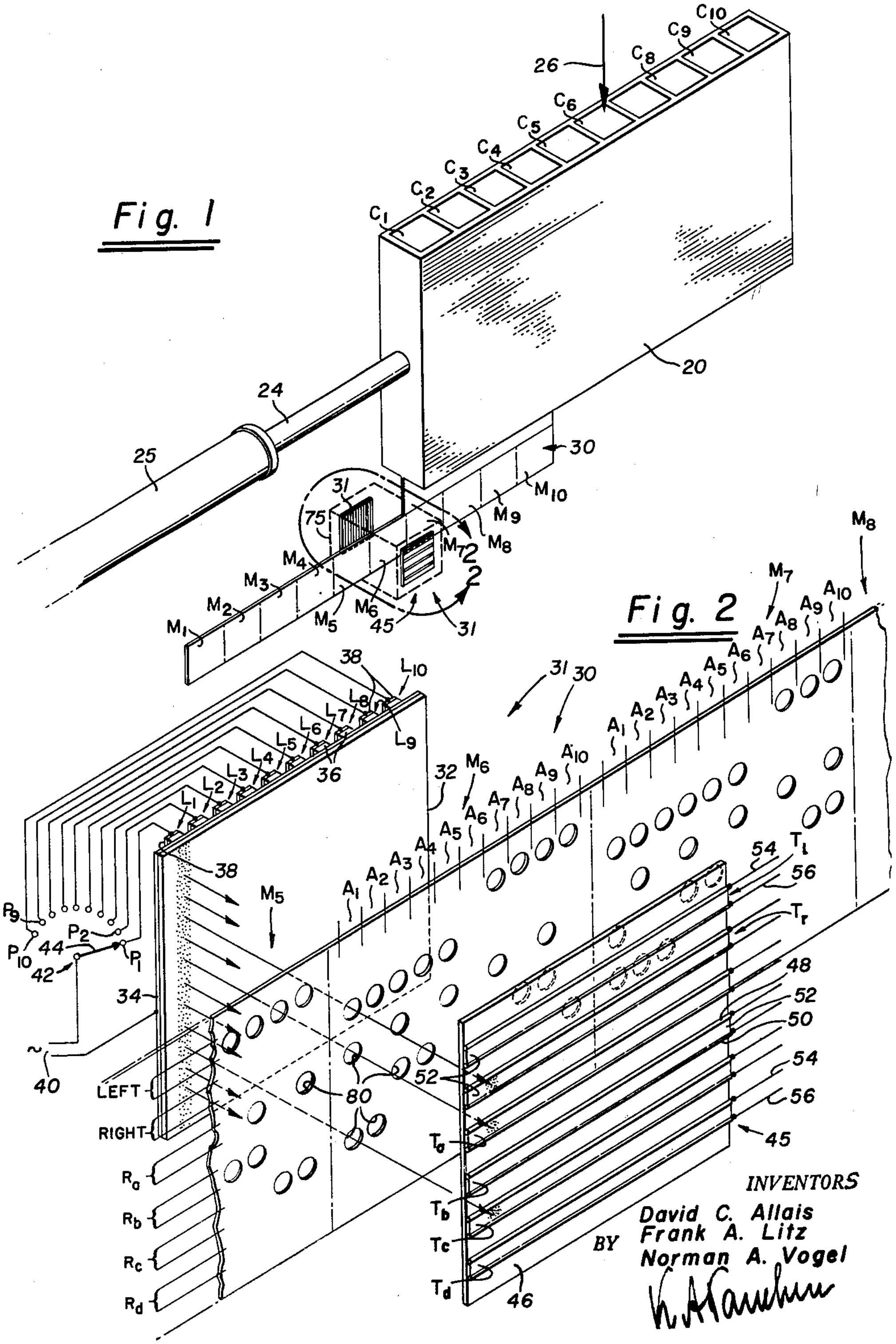

The present invention relates to mechanisms for moving the bins or drawers that are employed to store juxtaposed strips of magnetizable material upon which information has been magnetically recorded.

Such drawers are usually divided into a plurality of compartments or cells that are open at the top so that tags provided at the upper ends of the strips may readily be gripped, and a selected strip thus be individually withdrawn from the drawers by a suitable strip-drawing mechanism. In practice, a plurality of such drawers are usually placed side by side to form a group or battery, and to withdraw a selected strip from the many adjacently positioned stacks of strips, the strip-drawing mechanism may be arranged to move transversely across the battery of adjacently positioned drawers into position above the particular drawer wherein the selected strip is stored while said drawer in turn is moved in a longitudinal direction into a position wherein the cell containing the selected strip is located directly under said mechanism.

The extent to which a drawer must be moved to place the cell containing the selected information strip under the strip-drawing mechanism does not only depend upon the location of the particular cell within the drawer, it also depends upon the position of the drawer longitudinally of its path of movement which varies continually during practical use of the information storage apparatus as one or the other of its cells is placed underneath the strip-drawing mechanism to enable said mechanism to draw a selected strip therefrom. Thus, in operating the mechanism for moving the drawer to a selected position, it is not only necessary to know in what particular cell thereof the required information strip is stored, it is also necessary to remember in which position the drawer was placed during the directly preceding information collecting operation. In the past, therefore, automatic arrangements for recovering a desired information strip from a battery of drawers of the type described, required a rather complex control apparatus for the drawer moving mechanism involving memory devices to keep track of the position of the drawer, and computers to determine how far and in which direction a drawer had to be moved from its last recorded position to place a particular cell thereof under the strip-drawing mechanism.

It is an object of our invention to simplify the motion control apparatus for drawers of information storage arrangements of the type described above.

More particularly, it is an object of our invention to provide a control apparatus for the drawer-moving mechanisms of information storage arrangements of the type referred to, that does not require memory devices or computers to move a selected cell of the drawer underneath the strip-drawing mechanism.

Still another object of our invention is to provide a control apparatus for the drawer-moving mechanism that requires no more than the setting of a switch to move a selected cell of the drawer underneath the strip-drawing mechanism irrespective of the position in which the drawer may be at the time when it is to be moved to place said cell nderneath said strip-drawing mechanism.

Figure 3:
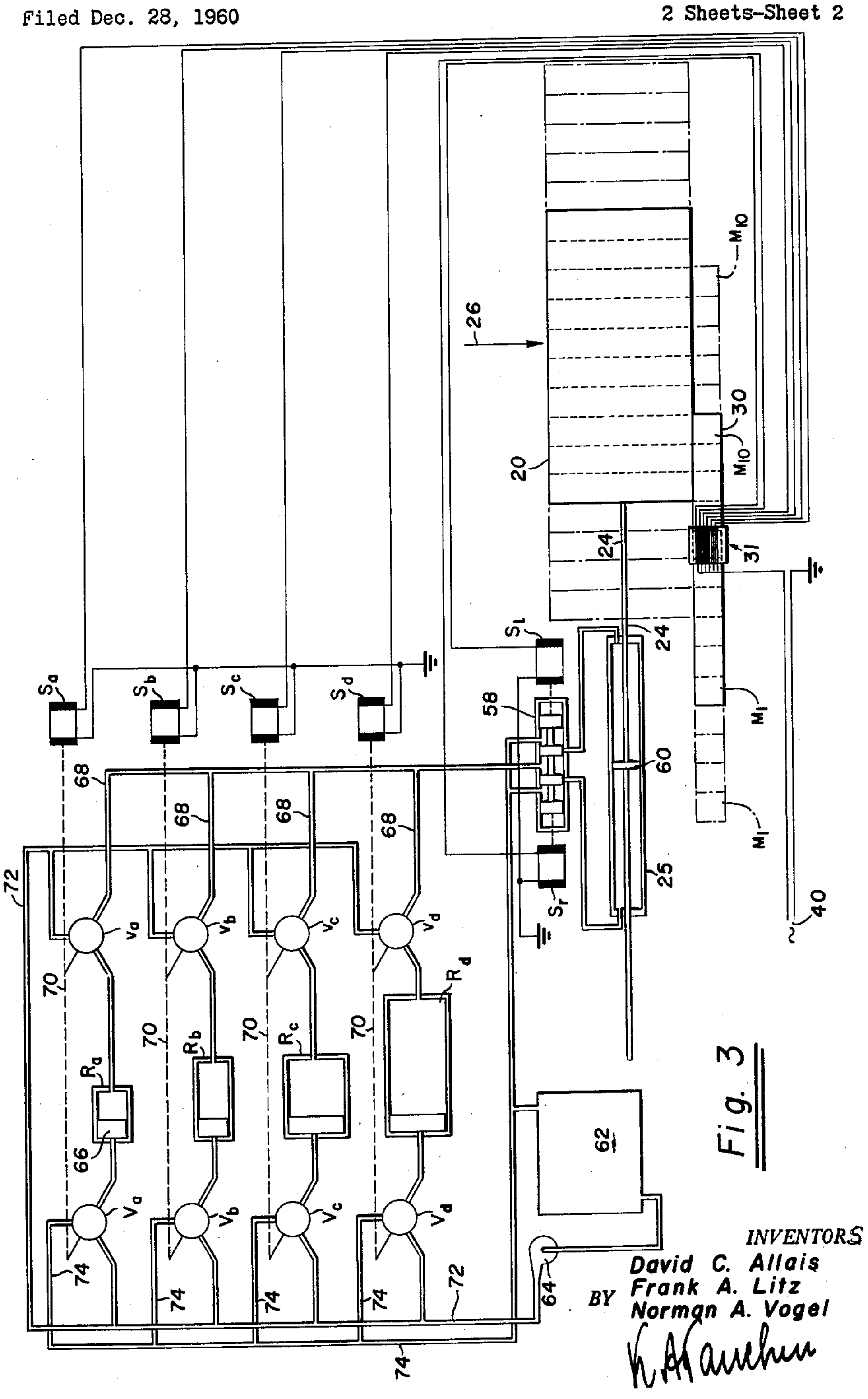

These and other objects of our invention will be apparent from the following description of the accompanying drawings which illustrate a preferred embodiment of the invention wherein FIGURE 1 is a schematic perspective of a drawer, a hydraulic mechanism for moving the drawer and the apparatus of our invention for controlling the operation of said hydraulic mechanism to move the drawer to a selected point;

FIGURE 2 is an enlarged fragmentary and partly schematic perspective of the operation control apparatus illustrated in FIGURE 1; and FIGURE 3 is a combined electric and hydraulic circuit diagram illustrating the manner in which the control apparatus shown in FIGURE 2 operates the hydraulic mechanism for moving selected cells of the drawer into a predetermined position.

Having first reference to FIGURES 1 and 3, the numeral 20 indicates an information storage drawer that is divided into ten cells or compartments $C_1$ to $C_{10}$ by partitions 22 and which is operatively connected to the piston rod 24 of a hydraulic slave cylinder 25 by which it may selectively be moved to any one of ten consecutive positions to place every one of its cells below a strip-drawing mechanism that is symbolically represented by the arrow 26. Each of the cells $C_1$ to $C_{10}$ contains a stack of juxtaposed information recording strips (not shown). Secured to the drawer 20 for movement therewith is an elongated mask 30 which is of an overall length equal to the length of the drawer 20 and which is divided into ten consecutive sections $M_1$ to $M_{10}$ of equal size that correspond to the ten cells or compartments $C_1$ to $C_{10}$ into which the drawer 20 is divided.

Located adjacent one side of the mask 30 at a point along its path of movement where its first section $M_1$ is located when the drawer is in its rightmost position as shown in broken lines in FIGURE 3, or where its last section $M_{10}$ is located when the drawer is in its leftmost position as also shown in broken lines in said FIGURE 3, is a device 31 comprising ten strip-shaped sources of radiant energy $L_1$ to $L_{10}$. In the particular embodiment of the invention illustrated in the accompanying drawing, this device is formed by a plate of glass 32 of a size equal to the size of the sections M of the mask 30 and upon its rear surface said plate is provided with a transparent electrically conductive coating indicated with exaggerated thickness at 34 in FIGURE 2. Secured to said rear surface are ten vertically disposed parallel bars 36 of electroluminescent material whose rear surfaces are metal plated as shown at 38.

The conductive coating 34 at the back of plate 32 is connected to one pole of a source of alternating voltage 40, and the metal platings 38 at the backs of the bars 36 may each be selectively connected to the opposite pole of said source of alternating voltage by a multi-pole switch 42 whose arm 44 may be set to any one of ten contact points $P_1$ to $P_{10}$.

Located on the other side of the mask 30 in transverse alignment with the plate 32 is an apparatus 45 for detecting radiant energy. In the particular embodiment of the invention illustrated in FIGURE 2, said apparatus is formed by a transparent plate 46 of insulating material which carries on its rear side, i.e. the side removed from the mask 30, six horizontally disposed vertically spaced tracks $T_l$, $T_r$ and $T_a$, $T_b$, $T_c$ and $T_d$ each composed of a pair of parallel conductive bars 48 and 50 with a layer 52 of photosensitive material disposed therebetween. The bars of each track are provided with electrical leads 54 and 56, and each of said tracks forms a normally non-conductive link or junction in the power circuit of one of a plurality of solenoids which control the setting of direction and distance determining components of the hydraulic system of slave cylinder 25. The uppermost track $T_l$ forms part of the power circuit of a solenoid $S_l$ (FIGURE 3) which upon energization acts to set a direction control valve 58 in the hydraulic circuitry of the slave cylinder 25 from a neutral position to an active position wherein it directs the flow of fluid under pressure into the cylinder 25 at the right side of its piston 60 and connects the opposite side of the cylinder to a sump indicated at 62 so that the drawer-actuating piston rod 24 will be pushed deeper into the cylinder 25 and move the drawer 20 to the left, as viewed in FIGURES 1 and 3. The second tracks $T_r$ form a part of the power circuit of another solenoid $S_r$ which upon energization sets the direction control valve 58 of the slave cylinder 25 from its neutral position to a position wherein it conducts fluid under pressure into the left end of the cylinder while opening its right end to sump 62 so that the piston of the slave cylinder and hence the drawer 20 are moved to the right as viewed in FIGURES 1 and 3. The remaining tracks, i.e. tracks $T_a$, $T_b$, $T_c$ and $T_d$ form normally non-conductive links of the power circuits of four solenoids $S_a$, $S_b$, $S_c$ and $S_d$, respectively, which control the amount of pressure fluid delivered into the slave cylinder, and in this manner control the degree of displacement of the piston and hence the distance of movement of the drawer 20.

Having particular reference to FIGURE 3, the solenoid $S_a$ is associated with a valve $V_a$ which normally blocks flow of fluid from a source of fluid under pressure represented by the pump 64 against the rear side of a plunger 66 which moves in a cylindrical reservoir $R_a$ that holds the exact amount of fluid required to move the piston 60 of slave cylinder 25 by an increment equal to the length of a cell of drawer 10. The conduit 68 leading from said reservoir to the direction-control valve 58 of slave cylinder 25 is controlled by a valve $v_a$ which is likewise actuated by the solenoid $S_a$ as schematically indicated by the broken line 70, and upon energization of said solenoid both the valves $V_a$ and $v_a$ are opened to allow pressure fluid to advance the plunger 66 of reservoir $R_a$ and to permit the metered fluid in the reservoir to reach the slave cylinder at its left or right end, as the case may be, depending upon the setting of the direction control valve 58. The solenoid $S_b$ is arranged, upon energization, to set the actuation control valve $V_b$ and the discharge control valve $v_b$ of another cylindrical reservoir $R_b$ of twice the capacity of reservoir $R_a$ to positions wherein the contents of said reservoir $R_b$ are delivered into the slave cylinder to move the piston thereof by an increment equal to the length of two cells of drawer 10. Similarly, the solenoid $S_c$ is arranged upon energization, to effect discharge of fluid from a reservoir $R_c$ that has twice the capacity of reservoir $R_b$ so that the piston of the slave cylinder is moved by an increment equal to the length of four consecutive cells of drawer 10, and the solenoid $S_d$ is arranged, upon energization, to effect discharge of an amount of fluid sufficient to move the piston 60 by an increment equal to eight consecutive drawer cells, for the cylindrical reservoir $R_d$ has twice the capacity of reservoir $R_c$. It will be apparent, therefore, that by selectively energizing any one of said solenoids $S_a$, $S_b$, $S_c$ and $S_d$ or desired combinations thereof, the drawer 20 may be moved at will any required distance, i.e. distances ranging from a distance equal to the length of one cell to a distance equal to the length of ten cells.

Hydraulic systems providing for metered amounts of pressure fluid to be delivered into a slave cylinder to move articles through precisely predetermined distances are well known in the art for which reason it is unnecessary, and would only burden the present disclosure to describe such a system in greater detail. May it suffice to point out that systems of this kind have means for restoring them to their initial position as soon as the activated control solenoids are de-energized. For this purpose the valves $v_a$, $v_b$, $v_c$ and $v_d$ while in a position effective to block the flow of fluid from the reservoirs to the slave cylinder, may be arranged to connect said reservoirs to a pressure line indicated at 72 through which the reservoirs are replenished whenever said valves are returned to their initial position after their respective reservoirs have discharged their contents into slave cylinder; and the valves $V_1$, $V_2$, $V_3$ and $V_4$ when in position to block the flow of pressure fluid against the rear of the plungers 66, may be arranged to connect the space behind said plungers to a sump as indicated by the line 74 so that said plungers may readily be returned to their initial positions by the pressure applied to their front faces through the restore line 72.

As long as the tracks $T_l$, $T_r$, $T_a$, $T_b$, $T_c$ and $T_d$ of apparatus 45 are kept in darkness, they form non-conductive links in the power circuits of the solenoids $S_l$, $S_r$, $S_a$, $S_b$, $S_c$, and $S_d$, respectively, and said solenoids are therefore inactive and the hydraulic system for the operation of the slave cylinder remains idle. While FIGURES 1 and 2 show the illumination device 31, the mask 30 and the detection apparatus 45 in exploded position for reasons of clarity, in practice they are placed closely together and form a tight sandwich which may be enclosed in a dark box indicated at 75 in FIGURE 1. Hence the layers of photosensitive material 52 between the bars 48 and 50 of the tracks T are non-conductive unless one of the photoluminescent strips of device 31 is energized. By throwing a beam of light on any spot of the photoconductive layers 52, however, any one of the tracks T may be rendered conductive and close the power circuit of its respective solenoid. Hence, by appropriate illumination of selected ones of the tracks T the hydraulic system may be set to advance the piston of the slave cylinder 25 in either direction by any number of increments that may be provided by the capacity of the individual reservoirs R or any combination thereof.

The mask 30 constitutes a sequence of charts or tables each of which indicates in ten adjacently positioned columns by holes 80 located at different levels corresponding to the different levels of the photosensitive links or junctions T of apparatus 45 just what operations are necessary to move the drawer from a particular position represented by the mask section in alignment with the motion control apparatus 31/45 to any of the remaining positions; and the sources of illumination $L_1$ to $L_{10}$ and the photosensitive junctions T of apparatus 45 are the means for converting the information recorded upon the mask sections into action.

In accordance with our invention therefore each of the sections M of the mask 30 is divided into ten strip-shaped area $A_1$ to $A_{10}$ nine of which are provided with perforations or apertures 80 while one is left imperforate. The perforations in nine of the ten areas of each mask represent instructions transmitted to the control apparatus 45 as to which of the control circuits of the hydraulic system must be energized to move the drawer 20 from the position represented by the particular mask section M to any one of the nine other possible positions thereof. In each of the strip-shaped areas provided with perforation, therefore, the location of the perforations is so chosen that, upon illumination of any one of the electro-luminescent strips $L_1$ to $L_{10}$ the vertical row of holes interposed between the illuminated strip and the photo-sensitive control apparatus 45 will allow light to reach the photosensitive links or junctions T of those control solenoids of the hydraulic system whose energization is necessary to move the cell corresponding to the illuminated strip underneath the strip-drawing mechanism. However, when the strip L is illuminated which corresponds to the cell that is located underneath the strip-drawing mechanism at the moment, the imperforate area of the mask section M covers said strip so that light cannot reach any of the photosensitive junctions in the control circuitry of the hydraulic system. Hence, said system remains at rest.

In FIGURES 1 and 3, cell $C_6$ of the drawer happens to be disposed underneath the strip-drawing mechanism 26 and section $M_6$ of the mask is therefore disposed between the illumination device 31 and the solenoid control apparatus 45. The leftmost row $A_1$ of apertures 80 in said mask section $M_6$ is aligned with illumination strip $L_1$ of device 31, and is intended to activate those of the control solenoids of the hydraulic system that will place the first cell $C_1$ of the drawer 10 underneath the strip-drawing mechanism. Row $A_1$ therefore has no aperture at the level of the uppermost track $T_l$ of the control apparatus 45 since obviously the control solenoid $S_l$ for setting the direction control valve 58 of the hydraulic cylinder for movement to the left must not be energized. It has, however, an aperture at the level of the second $T_r$. This means that upon illumination of the first strip $L_1$ the second track $T_r$ upon the control apparatus 45 is rendered conductive resulting in energization of the direction control solenoid $S_r$ that sets the direction control valve 58 of the slave cylinder for movement of the piston thereof to the right as viewed in FIGURES 1 and 3. In addition the first column $A_1$ of the mask section $M_6$ has apertures opposite the third and fifth tracks of the control apparatus, i.e. tracks $T_a$ and $T_c$. These tracks control the power circuits for the solenoids $S_a$ and $S_c$ that cause the contents of the first and third reservoirs, i.e. reservoirs $R_a$ and $R_c$, to be driven into the slave cylinder 25. The first reservoir $R_a$ contains the amount of fluid necessary to move the piston of the slave cylinder by an increment equal to the length of one cell, and the third reservoir $R_c$ contains the amount of fluid necessary to move the piston by an increment equal to the length of four consecutive cells. Hence, when an operator wishes to place the first cell $C_1$ of the drawer under the strip-drawing mechanism 26 and therefore illuminates the first strip $L_1$ of the device 31 by setting the arm 44 of the switch 42 to contact pole $P_1$, column $A_1$ of section $M_6$ of the mask passes light through the second aperture of the column $A_1$ to condition the hydraulic system for rightward movement of the drawer, and passes light through the third and fifth apertures of said column to provide the amount of hydraulic fluid necessary to effect movement of the drawer through a distance equal to the length of five consecutive cells, which is the distance of travel necessary to place the first cell of the drawer underneath the strip-drawing mechanism.

Similarly, if it were desired to move the drawer from the position shown in FIGURES 1 and 3 to a position wherein its ninth cell is disposed below the strip-drawing mechanism, the operator merely sets the switch arm 44 to contact pole $P_9$ causing the strip $L_9$ of device 31 to light up, and the apertures in the ninth column of the sixth mask section $M_6$ are so chosen as to conduct light onto the photosensitive layers of those tracks, i.e. tracks $T_l$, $T_a$ and $T_b$, which control energization of the solenoids $S_l$, $S_a$ and $S_b$ that establish movement of the piston 60 in the slave cylinder to the left through a distance equal to the longitudinal width of three consecutive cells.

The same situation exists no matter which cell of the drawer is located below the strip-drawing mechanisms at the moment, or expressed differently, which section of the mask is located between the illumination device 31 and the photosensitive control apparatus 45 at the time an operator wishes to place a selected cell of the drawer underneath the strip-drawing mechanism. Having again reference to FIGURE 2, let us assume that section $M_7$ of the mask were located between the illumination device 31 and the control apparatus 45 as a result of the fact that cell $C_7$ of the drawer is located below the strip-drawing mechanism. Let it now be assumed that an operator would wish to place cell $C_2$ below the strip-drawing mechanism. Without knowing the position of the drawer at the time, he would merely set the arm of switch 42 to contact point $P_2$ causing the strip $L_2$ of device 31 to light up, and the apertures in the second column of the mask section $M_7$, which column is in alignment with the illuminated strip $L_2$ at the moment, will direct light to the second track $T_r$ of apparatus 45 setting the hydraulic system for movement of the cylinder piston to the right, and will also direct light to the third and fifth tracks $T_a$ and $T_c$ providing for such an amount of fluid to be delivered into the slave cylinder 25 that will move the drawer through a distance equal to the length of five consecutive cells from the position wherein it presented cell $C_7$ to the strip-drawing mechanism to a position wherein it presents cell $C_2$ to said mechanism.

It is a simple matter to determine for each of the ten positions of the drawer the set of operations of the hydraulic system necessary to move the drawer to any one of the other nine positions and to provide in every one of the ten mask sections the nine columns of properly located holes which upon illumination of a selected strip of the illumination device will cause energization of the hydraulic control solenoids whose operation is necessary to move the drawer to the position corresponding to the illuminated strip.

The motion control apparatus of our invention is of a relatively simple and inexpensive construction. It may be operated by the mere setting of a switch to move a drawer to any selected position no matter what the location of the drawer may be at the moment. It requires no memory devices or computers. It always moves the drawer directly to the desired position, without need to return it first to a starter position. It may readily be used to control the movement of articles other than the particular information storage bins described hereinbefore, and illustrated in the drawings.

While we have explained our invention with the aid of a particular embodiment thereof, it will be understood that the invention is not limited to the specific constructional details shown and described which may be departed from without departing from the scope and spirit of the invention. Thus, neon tubes or shutter-controlled light slits may obviously be employed in place of the particular electroluminescent devices illustrated and described. It will also be understood that the masks employed in accordance with our invention need not actually have apertures but may be made of opaque material having transparent areas. Hence, wherever in the appended claims we speak of a mask having perforations or apertures, these terms are intended to include masks having transparent or translucent areas in place of actual apertures.

What is claimed is:

1. An arrangement for moving an article through a plurality of positions including a plurality of motion determining components, normally de-energized control circuits for said motion-determining components, and a control apparatus for dispatching the article selectively from any one of said positions to any one of the remaining positions comprising a plurality of members of photoconductive material forming normally non-conductive links in the control circuits of said motion-determining components; arranged opposite said photoconductive members a number of sources of radiant energy, each corresponding to one of said positions; means operable to energize a selected one of said sources of radiant energy; and interposed between said sources of radiant energy and said members of photosensitive material and mounted for movement with the article, a mask having sections each corresponding to one of said positions and each having sets of apertures adapted to be aligned with said sources of radiant energy, the apertures in each set being so chosen as to permit light from an aligned source of radiant energy upon energization thereof to reach and render conductive the members of photosensitive material in the control circuits of those motion-determining components necessary to move the article from the position represented by alignment of a particular mask section with said sources of radiant energy to the position corresponding to the energized source of radiant energy.

2. An arrangement for moving an article through a plurality of equi-spaced positions including a plurality of direction and motion determining components normally de-energized control circuits for said direction- and motion-determining components, and a control apparatus for dispatching the article selectively from any one of said positions to any one of the remaining positions comprising a plurality of vertically superposed horizontally disposed strip-shaped layers of photoconductive material forming normally non-conductive links in the control circuits of said direction- and motion-determining components; arranged opposite said photoconductive layers, a number of vertically disposed, adjacently positioned strip-shaped sources of radiant energy, each corresponding to one of said positions; means operable to energize a selected one of said sources of radiant energy; and interposed between said sources of radiant energy and said layers of photosensitive material and mounted for movement with the article, an elongated mask having sections of a length equal to the distance between adjacent positions and corresponding each to one of said positions, each of said sections having vertically disposed rows of apertures adapted to be aligned with individual ones of said sources of radiant energy, the apertures in each row being so chosen as to permit light from an aligned source of radiant energy, upon energization thereof, to reach and render conductive the layers of photosensitive material in the control circuits of those direction- and motion-determining components necessary to move the article from the position represented by alignment of a particular mask section with said sources of radiant energy, to the position corresponding to the energized source of radiant energy.

3. An arrangement for moving an article through a plurality of equi-spaced positions including a plurality of direction and motion determining components, normally de-energize control circuits for said direction- and motion-determining components, and a control apparatus for dispatching the article selectively from any one of said positions to any one of the remaining positions comprising a plurality of vertically superposed horizontally disposed pairs of conductive bars having layers of photoconductive material arranged therebetween, said layers forming normally non-conductive links in the control circuits of said direction- and motion-determining components; arranged opposite said photoconductive layers, a number of vertically disposed, adjacently positioned strip-shaped sources of radiant energy, each corresponding to one of said positions; means operable to energize a selected one of said sources of radiant energy; and interposed between said sources of radiant energy and said layers of photosensitive material and mounted for movement with the article, an elongated mask having sections of a length equal to the distance between adjacent positions and corresponding each to one of said positions, each of said sections having vertically disposed rows of apertures adapted to be aligned with individual ones of said sources of radiant energy, the apertures in each row being so chosen as to permit light from an aligned source of radiant energy, upon energization thereof, to reach and render conductive the layers of photosensitive material in the control circuits of those direction- and motion-determining components necessary to move the article from the position represented by alignment of a particular mask section with said sources of radiant energy, to the position corresponding to energized source of radiant energy.

References Cited in the file of this patent

UNITED STATES PATENTS 2,950,418 Reis ------------------ Aug. 23, 1960